(12) United States Patent
Wieczorek et al.

(10) Patent No.: US 6,882,848 B2
(45) Date of Patent: Apr. 19, 2005

(54) METHOD AND COMPUTER-READABLE MEDIUM FOR CONTROLLING SIGNALING AND CHANNEL ASSIGNMENT IN A DECENTRALIZED TRUNKED RADIO SYSTEM

(75) Inventors: Dariusz Wieczorek, Forest, VA (US); Neeraj Moondra, Herndon, VA (US); Robert Speidel, Forest, VA (US)

(73) Assignee: M/A-Com Private Radio Systems, Inc., Lynchburg, VA (US)

( * ) Notice: Subject to any disclaimer, the term of this patent is extended or adjusted under 35 U.S.C. 154(b) by 566 days.

(21) Appl. No.: 10/073,654

(22) Filed: Feb. 11, 2002

(65) Prior Publication Data

US 2003/0153319 A1 Aug. 14, 2003

(51) Int. Cl.[7] ................................................ H04Q 7/20
(52) U.S. Cl. ...................... 455/450; 455/509; 455/518; 455/464; 320/340
(58) Field of Search .................................. 458/450, 455, 458/452.1, 436, 518, 519, 520, 521, 509, 524; 370/329, 340, 341, 348

(56) References Cited

U.S. PATENT DOCUMENTS

| 5,299,199 A | * | 3/1994 | Wilson et al. | 370/347 |
| 5,355,516 A | * | 10/1994 | Herold et al. | 455/510 |
| 5,533,024 A | * | 7/1996 | Owada | 370/347 |
| 5,697,058 A | * | 12/1997 | Paavonen | 455/509 |
| 6,804,529 B1 | * | 10/2004 | Barnes et al. | 455/515 |

OTHER PUBLICATIONS

Whitepaper titled "EDACS Explained", as retrieved on Jan. 28, 2002 from URL http://www.trunkedradio.net/trunked/edacs/EDACS_Whitepaper.pdf.

Whitepaper titled LTR Trunking System technical description, as retrieved on Feb. 1, 2002, from URL http://www.virtualcomm.com/cnm/faq/e/ltr.htm.

* cited by examiner

Primary Examiner—Charles Appiah
(74) Attorney, Agent, or Firm—Enrique J. Mora, Esq.; Beusse, Brownlee, Wolter, Mora & Maire, P.A.

(57) ABSTRACT

Method and computer-readable medium are provided for controlling signaling and channel assignment in a decentralized trunked radio system to operationally mimic a centralized trunked radio system. The method allows monitoring a parameter indicative of elapsed time of channel activity, such as control channel or working channel activity or both, presently being carried in a respective one of a plurality of radio frequencies assigned to the radio system. Upon the parameter indicative of elapsed time of channel activity reaching a respective target value, the method allows determining whether there is another radio frequency in the plurality of radio frequencies assigned to the radio system available for carrying the channel activity presently being carried by the one radio frequency. If the determining action indicates the presence of an available radio frequency for carrying the channel activity, the channel activity is shifted from the one radio frequency to the available radio frequency. The method allows iteratively performing the foregoing actions for each of the plurality of radio frequencies assigned to the radio system so that radio channel activity, upon reaching the target value, is sequentially shifted to any radio frequency determined to be available, and thus ensuring that each radio frequency assigned to the radio system is generally free in a time interval commensurate with the respective target value.

14 Claims, 2 Drawing Sheets

METHOD AND COMPUTER-READABLE MEDIUM FOR CONTROLLING SIGNALING AND CHANNEL ASSIGNMENT IN A DECENTRALIZED TRUNKED RADIO SYSTEM

BACKGROUND OF THE INVENTION

The present invention is generally related to radio control techniques, and, more particularly, to method and computer-readable medium configured to control signaling and channel assignment in a decentralized trunked radio system to operationally mimic a centralized trunked radio system.

In a conventional (non-trunked) radio system, a radio can generally access only one channel at a time. If that channel is in use, the user must either wait for the channel to become idle or manually search for a free channel. A trunked radio system differs from a conventional system by having the ability to automatically search all available channels for one that is clear. In the United States, the Federal Communications Commission (FCC) has recognized at least two main types of trunking: centralized and decentralized. A centralized trunked system uses one or more control channels to transmit channel assignment information to the mobile radios. In a decentralized trunked system, the mobile radios scan the available channels to find one that is clear. The rules require that licensees take reasonable precautions to avoid causing harmful interference, including monitoring the transmitting frequency for communications in progress. This requirement is met in decentralized trunked systems because each mobile unit monitors each channel and finds a clear one to transmit on. In a centralized trunked radio system, radios typically monitor the control channel(s), not the specific transmit frequencies. Therefore, this form of trunking has not, generally, been allowed in the shared bands, typically below 800 MHz.

In view of the foregoing, users of Specialized Mobile Radios (SMRs),—also generally known as LMR (Land Mobile Radio), PAMR (Public Access Mobile Radio), PMR (Private Mobile Radio), TMR (Trunked Mobile Radio), TRS (Trunked Radio System), etc.—that share a plurality of non-exclusive radio channels (shared bands) have been unable to take advantage of digitally addressed trunked systems due to such regulatory requirements, generally referred to as de-centralized operation requirements. Decentralized operation commonly requires that: a) each channel must be available for all users licensed on a particular frequency, effectively prohibiting use of a dedicated control channel; and b) each channel must be monitored and determined as available before being used. In practice, the users of these channels have been forced to remain with older technologies, not utilizing a dedicated-control channel, with concomitant lower efficiency and limited functionality.

One known solution is to provide a scan function in the user terminals combined with analog tone signaling on the repeaters. For example, the radios constantly search the pre-programmed frequencies for signaling they are programmed to respond to. A variety of different signaling schemes has been used in the past: Improved Mobile Telephone System (IMTS), GE-MarcV radio system, Dual Tone Multiple frequency (DTMF), five-tone schemes, and others. Unfortunately, such schemes are generally based on primitive analog signaling, resulting in slow access time and rudimentary functionality when compared to presently available digitally signaled trunked systems with control channel functionality, such as provided by the EDACS® radio system, purveyed by the assignee of the present invention.

Thus, it would be desirable to provide system and techniques that can accommodate an ever-increasing number of users on limited shared bands while providing such users with improved features commonly available to users of trunked radio systems in frequency ranges not subject to shared channel operation restrictions. It would be further desirable to provide digital signaling that essentially mimics a centralized control channel operation and can be cycled among all channels in the system, meeting both the intent and the letter of existing governmental regulations.

BRIEF SUMMARY OF THE INVENTION

Generally, the present invention fulfills the foregoing needs by providing in one aspect thereof, a method for controlling signaling and channel assignment in a decentralized trunked radio system to operationally mimic a centralized trunked radio system. The method allows monitoring a parameter indicative of elapsed time of channel activity, such as control channel or working channel activity or both, presently being carried in a respective one of a plurality of radio frequencies assigned to the radio system. Upon the parameter indicative of elapsed time of channel activity reaching a respective target value, the method allows determining whether there is another radio frequency in the plurality of radio frequencies assigned to the radio system available for carrying the channel activity presently being carried by the one radio frequency. If the determining action indicates the presence of an available radio frequency for carrying the channel activity, the channel activity is shifted from the one radio frequency to the available radio frequency. The method allows iteratively performing the foregoing actions for each of the plurality of radio frequencies assigned to the radio system so that radio channel activity, upon reaching the target value, is sequentially shifted to any radio frequency determined to be available, and thus ensuring that each radio frequency assigned to the radio system is generally free in a time interval commensurate with the respective target value.

The present invention further fulfills the foregoing needs by providing in another aspect thereof a computer-readable medium including instructions causing a computer to control signaling and channel assignment in a decentralized trunked radio system to operationally mimic a centralized trunked radio system. The foregoing control being implemented by monitoring a parameter indicative of elapsed time of channel activity presently being carried in a respective one of a plurality of radio frequencies assigned to the radio system. Upon the parameter indicative of elapsed time of channel activity reaching a respective target value, a determination is made as to whether or not there is another radio frequency in the plurality of radio frequencies assigned to the radio system available for carrying the channel activity presently being carried by the one radio frequency. If the determining action indicates the presence of an available radio frequency for carrying the channel activity, the channel activity is shifted from the one radio frequency to the available radio frequency. The foregoing actions are iteratively performed for each of the plurality of radio frequencies assigned to the radio system so that radio channel activity, upon reaching the target value, is sequentially shifted to any radio frequency determined to be available, and thus ensuring that each radio frequency assigned to the radio system is generally free in a time interval commensurate with the respective target value.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
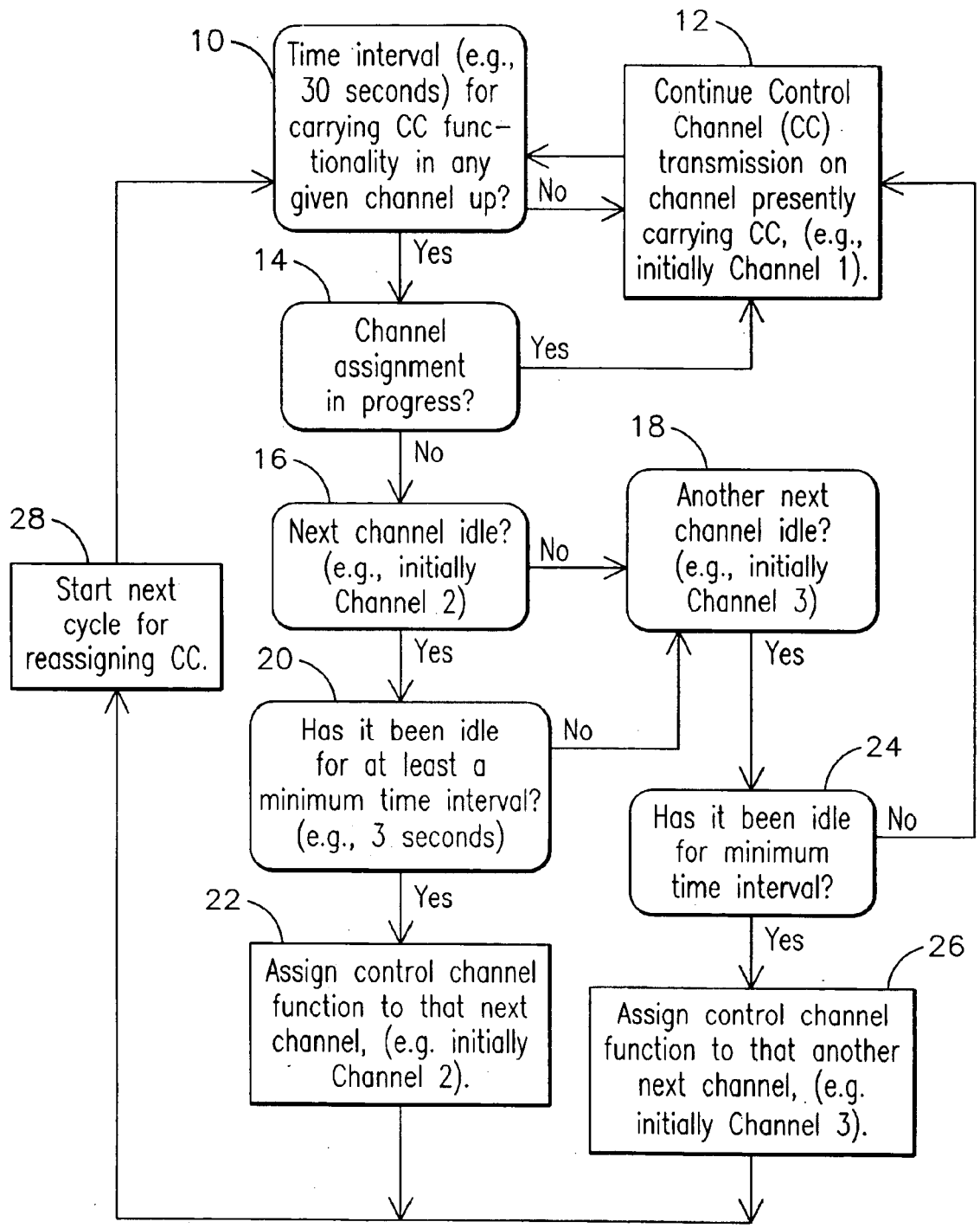
FIG. 1 is a flow chart of exemplary actions embodying aspects of the present invention, such as may occur in one exemplary scenario wherein the radio system is idle and the control channel of a trunked radio systems is successively re-assigned to an available radio frequency assigned to the radio system so that each radio frequency is generally free in a time interval commensurate with a respective target limit value.

The present invention in aspects thereof provides improved control channel assignment algorithms that are configured to achieve the following actions: successively cycle or transition the control channel through every radio channel assigned to a given radio system at predefined time intervals, provided that a channel to be assigned the control channel functionality is not presently occupied; prevent loss of communications and call records during the transition; monitor channels in the system for activities prior to assigning them to either working or control channel functionality thus avoiding interference with other users sharing the assigned frequency spectrum; determine, based on one or more programmable parameters, whether a given channel can be probabilistically deemed as available for assignment.

In one exemplary embodiment, the software operating the network is configured to determine when the control channel function should be transitioned from one radio frequency to another. The software is also configured to determine whether a given frequency is suitable for use, either as the control channel or a working channel. Depending on the specific application, standard hardware and software provisions well-understood by those skilled in the art may be made available in each base station to monitor traffic in each radio channel in the system. For example, in the case of duplex-frequency channels, in base stations already equipped with a receiver for monitoring an uplink frequency, no further provisions need to be made in the event monitoring of such uplink frequency is desired. Conversely, in base stations not equipped with a receiver for monitoring a downlink frequency, provisions would be needed in the event monitoring of such downlink frequency is desired. In this case, the provisions would comprise including a standard receiver configured to monitor the downlink frequency.

In a typical scenario, the system will transition or shift its control channel in an orderly manner at a programmable interval, for example, every 30 seconds. Prior to the control channel function being re-assigned to a new frequency, recent activity (or lack thereof) on that radio frequency will be verified—if no activity has been detected during a pre-programmed period, for example, the last three seconds, the re-assignment will take place. Conversely, if that frequency has been in use during the last three seconds, the system will examine the next communication channel and sequentially repeat the process until the control channel can be reassigned.

The user terminals will be pre-programmed with all channel frequencies assigned to a given radio system. In the idle mode, the terminals will be configured to search and monitor for control channel activity. Some parameters in the algorithm can be varied to optimize it for the requirements of any particular application. Examples of these parameters are listed below along with one set of exemplary values believed to address the needs of one practical implementation. It will be understood, however, that the present invention is not limited to any specific set of values. For example, the first parameter (maximum time of control channel activity in any given radio frequency) would be chosen to reasonably meet the letter and intent of applicable regulations in the sense that every radio frequency would be generally available to users in a time interval commensurate with the target value selected for that first parameter. The second parameter (minimum time a frequency should be activity-free in order for that frequency to be declared as available for carrying a radio channel activity) would be chosen to account for statistically predictable factors in human speech, such as normal gaps before a user responds, etc., and thus improve the accuracy and reliability for determining each radio frequency availability.

| | |
|---|---|
| Maximum time Control Channel can be assigned to a given radio frequency without interruption | e.g., about 30 sec |
| Minimum time a frequency is activity-free before it is determined as available | e.g., about 3 sec |

FIG. 1 is a flow chart of exemplary actions embodying aspects of the present invention, such as may occur in one exemplary scenario wherein the radio system is idle. For the sake of simplicity of description, let us assume that the system is made up of three radio channels or frequencies. It will be understood that the present invention is not limited to any specific number of radio channels. Let us further assume a 30 second maximum transmission time in any given channel, and a 3 second minimum monitoring time for determining whether any other channel is available for supporting a new control channel assignment. For initial conditions assume that channel 1 is initially acting as the control channel and channels 2 and 3 are idle. As illustrated at block 10, a determination is made as to whether the maximum transmission time for the present channel has elapsed, (e.g., are the 30 seconds up). If the maximum transmission time has not been reached, as illustrated at block 12, channel 1 would continue to function as the control channel. Conversely, if the maximum transmission time has been reached, as illustrated in block 14, a determination would be made as to whether a channel assignment is in progress. If channel assignment is in progress, channel 1 once again would continue to provide control channel transmission. If channel assignment is not in progress, as shown at block 16, a determination would be made as to whether or not a next new channel (e.g., initially channel 2) is available for carrying the control channel functionality. If that next channel (e.g., channel 2) is busy, i.e., not idle, as shown at block 18, another determination would be made as to whether or not yet another next new channel (e.g., channel 3) is idle. In the event channel 2 is presently idle, as shown at block 20, a determination would be made as to how long channel 2 has been idle. That is, determining whether that channel has been activity-free for at least the 3 second minimum idle time. If the outcome of block 20 is that channel 2 has been activity-free for the minimum 3 second idle time, as shown at block 22, the control channel function would be assigned to the presently available channel (e.g., channel 2). As shown at block 28, once a control channel reassignment has been completed in a present cycle, a new cycle or iteration for reassigning the control channel would continue at block 10. If the outcome of block 20 is that channel 2 has not been idle for the minimum idle time (e.g., 3 seconds), then, once again, a determination would be made at block 18 as to whether or not another new channel (e.g., channel 3) is presently idle. If the outcome from block 18 is that channel 3 is presently idle, and has been idle for at least the minimum idle time, as shown at blocks 24 and 26, then the control channel function would be assigned to the presently available channel (in this case channel 3). If there were no channels presently available, then the process would return to block 12 so that control channel transmission would continue on channel 1 until a new channel becomes available for carrying the control channel functionality. The foregoing description assumes for the sake of illustration an incremental control channel assignment, it will be understood that the present invention is not limited to any specific sequence for making such assignment. For example, one could have initially chosen in block 16, channel 3, in lieu of channel 2, and in block 18, channel 2, in lieu of channel 3.

Figure 2:
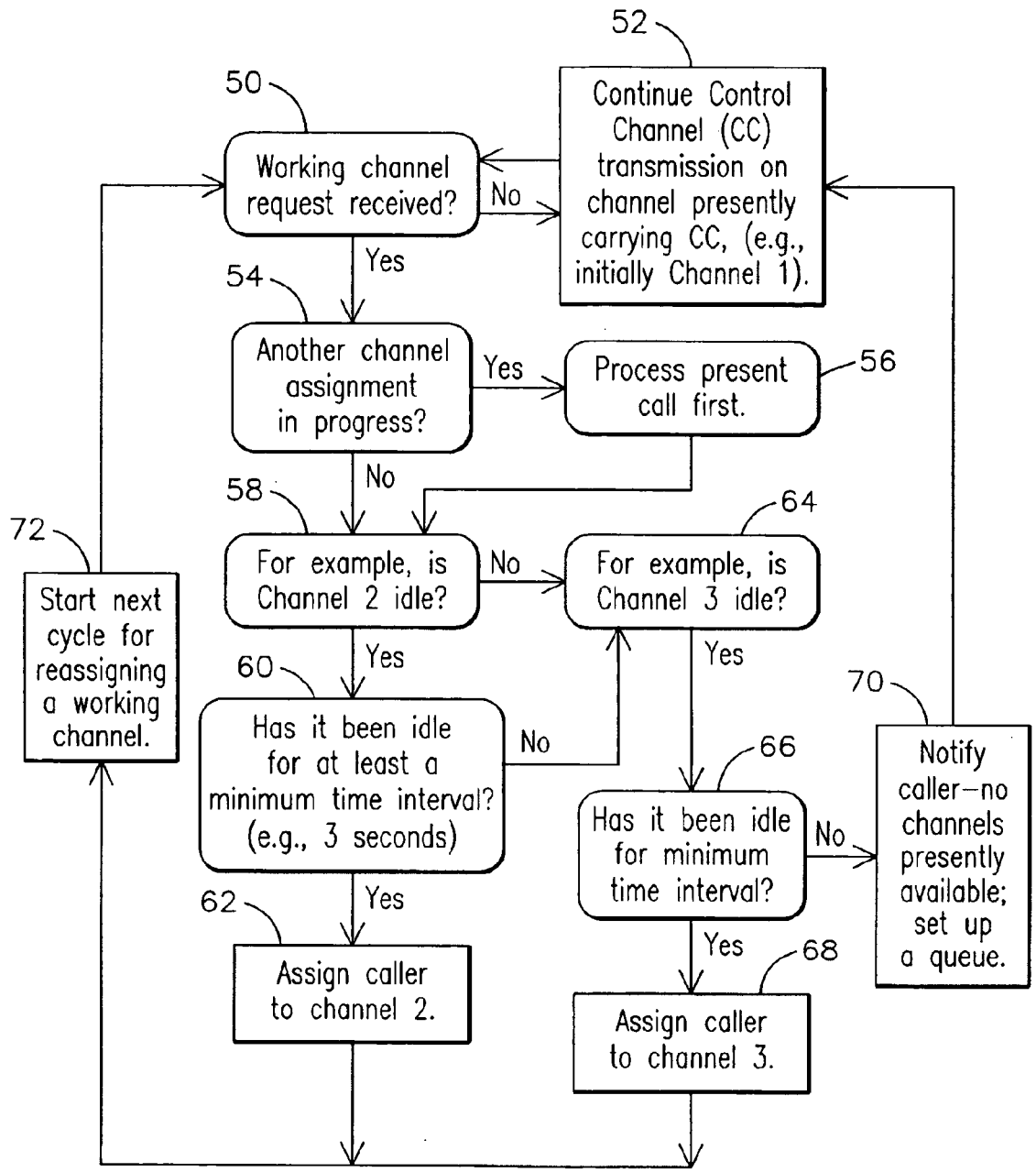
FIG. 2 is a flow chart of exemplary actions, such as may occur in another exemplary scenario wherein a call request from a mobile terminal is performed and a working channel function of a trunked radio system is successively re-assigned to an available radio frequency assigned to the radio system.

FIG. 2 is a flow chart of exemplary actions, such as may occur in another exemplary scenario wherein a call request from a mobile terminal is performed within the maximum transmission time (e.g., 30 seconds) upon a control channel change. Let us assume the same assumptions made in connection with the first scenario regarding minimum idle time. Further assume that channel 1 is initially acting as the control channel. As illustrated at block 50, an initial determination is made as to whether or not a working channel request has been received. If no working channel request has been received, as shown at block 52, continue control channel transmission in the channel presently carrying the control channel functionality, e.g., channel 1. If a working channel request is received, as shown at block 54, a determination is made as to whether or not another channel assignment is in progress. If another channel assignment is in progress, as shown at block 56, the present call would be processed first. If no other channel assignment is in progress, as shown at block 58, a determination would be made as to whether or not there is a next channel available for assigning a caller. As shown at block 58, a determination would be made as to whether one of the channels is available (e.g., initially whether channel 2 is idle). If channel 2 is available (i.e., channel 2 is idle), as shown at block 60, a determination is made as to whether or not that channel has been idle for a sufficient time interval (e.g., at least 3 seconds). If the outcome of block 60 is that channel 2 is available (i.e., activity-free for at least 3 seconds), as shown at block 62, the caller would be assigned to channel 2. If channel 2 is not available, (i.e., is not presently idle, or has not being idle for a sufficient amount of time), then a similar determination regarding availability would be made for each remaining channel (e.g., channel 3), as illustrated at blocks 64, 66 and 68, which essentially are respectively analogous to blocks 58, 60 and 62. In the event no new channel is available for assigning the call, then, as shown at block 70, prior to returning to block 52, a notification signal would be issued to the caller indicating that there are no channels presently available. A queue may be set up to arrange caller priority in the event of multiple call requests using techniques well-understood by those skilled in the art. For example, using a FIFO (First Input-First Output) queue arrangement provided any given caller has not declared an emergency. As represented at block 72, once a working channel reassignment has been completed in a present cycle, a new cycle or iteration for reassigning new caller requests would continue at block 50.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, flash memories, EEPROM, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling signaling and channel assignment in a decentralized trunked radio system to operationally mimic a centralized trunked radio system, the method comprising:

a) monitoring a parameter indicative of elapsed time of channel activity presently being carried in a respective one of a plurality of radio frequencies assigned to the radio system;

b) upon the parameter indicative of elapsed time of channel activity reaching a respective target value, determining whether there is another radio frequency in the plurality of radio frequencies assigned to the radio system available for carrying the channel activity presently being carried by the one radio frequency;

c) if the determining action indicates the presence of an available radio frequency for carrying the channel activity, shifting the channel activity from the one radio frequency to the available radio frequency; and d) iteratively performing actions a) through c) for each of the plurality of radio frequencies assigned to the radio system so that radio channel activity, upon reaching the target value, is sequentially shifted to any radio frequency determined to be available, and thus ensuring that each radio frequency assigned to the radio system is generally free in a time interval commensurate with the respective target value.

2. The method of claim 1 wherein the channel activity is selected from the group consisting of control and working channel activity.

3. The method of claim 1 wherein determining whether there is another radio frequency available for carrying the channel activity presently being carried by the one radio frequency comprises monitoring a parameter indicative of time-elapsed in an activity-free mode in said another frequency.

4. The method of claim 3 wherein when the time elapsed in the activity-free mode reaches a respective target value, said another radio frequency is determined to be available for carrying the channel activity presently being carried by the one radio frequency.

5. The method of claim 4 wherein in the event no radio frequency is determined to be available, continue the respective radio channel activity in the one radio frequency until at least one radio frequency is determined to be available.

6. The method of claim 1 further comprising prior to performing the action for determining whether there is another radio frequency available for carrying the channel activity presently being carried by the one radio frequency, monitoring whether a radio frequency assignment is in progress.

7. The method of claim 6 wherein in the event a radio frequency assignment is in progress, continue the respective radio channel activity in the one radio frequency until the radio frequency assignment is concluded and at least one radio frequency is determined to be available.

8. A computer-readable medium including instructions causing a computer to control signaling and channel assignment in a decentralized trunked radio system to operationally mimic a centralized trunked radio system by:
   a) monitoring a parameter indicative of elapsed time of channel activity presently being carried in a respective one of a plurality of radio frequencies assigned to the radio system;
   b) upon the parameter indicative of elapsed time of channel activity reaching a respective target value, determining whether there is another radio frequency in the plurality of radio frequencies assigned to the radio system available for carrying the channel activity presently being carried by the one radio frequency;
   c) if the determining action indicates the presence of an available radio frequency for carrying the channel activity, shifting the channel activity from the one radio frequency to the available radio frequency;
   d) iteratively performing actions a) through c) for each of the plurality of radio frequencies assigned to the radio system so that radio channel activity, upon reaching the target value, is sequentially shifted to any radio frequency determined to be available, and thus ensuring that each radio frequency assigned to the radio system is generally free in a time interval commensurate with the respective target value.

9. The computer medium of claim 8 wherein the channel activity is selected from the group consisting of control and working channel activity.

10. The computer medium of claim 8 wherein determining whether there is another radio frequency available for carrying the channel activity presently being carried by the one radio frequency comprises monitoring a parameter indicative of time-elapsed in an activity-free mode in said another frequency.

11. The computer medium of claim 10 wherein when the time elapsed in the activity-free mode reaches a respective target value, said another radio frequency is determined to be available for carrying the channel activity presently being carried by the one radio frequency.

12. The computer medium of claim 11 wherein in the event no radio frequency is determined to be available, continue the respective radio channel activity in the one radio frequency until at least one radio frequency is determined to be available.

13. The computer medium of claim 8 further comprising prior to performing the action for determining whether there is another radio frequency available for carrying the channel activity presently being carried by the one radio frequency, monitoring whether a radio frequency assignment is in progress.

14. The computer medium of claim 13 wherein in the event a radio frequency assignment is in progress, continue the respective radio channel activity in the one radio frequency until the radio frequency assignment is concluded and at least one radio frequency is determined to be available.

* * * * *